United States Patent
Khalil et al.

(10) Patent No.: US 7,112,229 B2
(45) Date of Patent: Sep. 26, 2006

(54) PROCESS FOR PRODUCING BIODIESEL FUEL USING TRIGLYCERIDE-RICH OLEAGINEOUS SEED DIRECTLY IN A TRANSESTERIFICATION REACTION IN THE PRESENCE OF AN ALKALINE ALKOXIDE CATALYST

(75) Inventors: Carlos Nagib Khalil, Rio de Janeiro (BR); Lúcia Cristina Ferreira Leite, Rio de Janeiro (BR)

(73) Assignee: Petroleo Brasileiro S.A. -Petrobras, Rio de Janeiro (BR)

( * ) Notice: Subject to any disclaimer, the term of this patent is extended or adjusted under 35 U.S.C. 154(b) by 253 days.

(21) Appl. No.: 10/621,569

(22) Filed: Jul. 18, 2003

(65) Prior Publication Data

US 2005/0011112 A1    Jan. 20, 2005

(51) Int. Cl.
  *C10L 1/18*    (2006.01)
  *A23L 1/20*    (2006.01)
  *A23L 1/36*    (2006.01)

(52) U.S. Cl. ............... 44/308; 44/307; 44/401; 426/44; 426/46; 426/53; 426/54

(58) Field of Classification Search ............. 44/307, 44/308, 401
See application file for complete search history.

(56) References Cited

U.S. PATENT DOCUMENTS

| | | | |
|---|---|---|---|
| 4,364,743 A | 12/1982 | Erner | |
| 4,695,411 A | 9/1987 | Stern et al. | |
| 5,525,126 A | 6/1996 | Basu et al. | |
| 5,578,090 A | 11/1996 | Bradin | |
| 5,710,030 A * | 1/1998 | Anderson | 435/134 |
| 5,750,751 A * | 5/1998 | Saam | 554/165 |
| 6,015,440 A | 1/2000 | Noureddini | |
| 6,127,560 A * | 10/2000 | Stidham et al. | 554/167 |
| 6,129,773 A | 10/2000 | Killick et al. | |
| 6,174,501 B1 | 1/2001 | Noureddini | |
| 6,211,390 B1 | 4/2001 | Peter et al. | |
| 6,506,423 B1 * | 1/2003 | Drouillard et al. | 426/2 |
| 6,573,396 B1 * | 6/2003 | Buchanan et al. | 558/277 |
| 6,897,255 B1 * | 5/2005 | Thames et al. | 524/398 |
| 2003/0161858 A1 * | 8/2003 | Lidgren | 424/423 |

FOREIGN PATENT DOCUMENTS

BR    8003739    5/1980

* cited by examiner

*Primary Examiner*—Joseph D. Anthony
(74) *Attorney, Agent, or Firm*—Sughrue Mion, PLLC

(57) ABSTRACT

An integrated process is described for producing biodiesel from oleaginous seeds, preferably castor bean seeds. The inventive process includes a transesterification reaction where the seeds themselves react with anhydrous ethyl alcohol in the presence of an alkaline catalyst. The resulting ethyl esters are then separated by decantation and neutralized and used as fuel for diesel engines, co-solvents for diesel and gasoline mixtures with anhydrous or hydrated ethyl alcohol. The solid fractions may be used as fertilizers, for feeding cattle and as a raw material for producing ethyl alcohol.

12 Claims, 1 Drawing Sheet

PROCESS FOR PRODUCING BIODIESEL FUEL USING TRIGLYCERIDE-RICH OLEAGINEOUS SEED DIRECTLY IN A TRANSESTERIFICATION REACTION IN THE PRESENCE OF AN ALKALINE ALKOXIDE CATALYST

FIELD OF THE INVENTION

The present invention relates to an integrated process for producing biodiesel-long chain fatty acid alkyl monoesters from vegetable oils, to be used as fuel or as fuel additives and economically viable by-products, such fatty acids being present in oleaginous seeds. More specifically, the present invention relates to a process for producing biodiesel by transesterification, whereby instead of reacting alcohol and castor bean-extracted oil, it is the castor bean seeds themselves that are made to react with alcohol, in the presence of an alkaline catalyst, to yield a fuel product made up of ethyl monoesters of the fatty acids present in those seeds. Also obtained is glycerin, a starchy product free from ricin useful for the formulation of cattle food and also used as raw material for producing ethyl alcohol or as a fertilizer and finally a mineral-rich product from the castor bean hull that may be used as a fertilizer.

BACKGROUND INFORMATION

Products known or classified as biodiesel are synthetic liquid fuels obtained from renewable raw materials and made up of mixtures of long chain fatty acid alkyl monoesters derived from vegetable oils or animal fat.

The use of such products as fuel, by themselves or in admixture with other products is well known. The reference international specification for this kind of product is the "Provisional Specification for Biodiesel Fuel (B100) Blend Stock for Distillate Fuels" defined by the American Society for Testing Materials (ASTM) and designed as PS 121-99.

Conventional processes for the industrial production of this kind of fuel are the transesterification unit processes where the triglycerides that make up the vegetable oils or the animal fats are made to react with lower alcohols, in the presence of acidic or basic catalysts.

U.S. Pat. No. 4,695,411 teaches one of these processes for producing a fatty acid monoester composition, useful as a fuel for a diesel engine as a replacement of gas oil. According to the teachings of said US patent, a transesterification of oils or greases of vegetable or animal origin is performed in three distinct steps, using four different anhydrous or hydrated alcohols, in the presence of acidic or basic catalysts.

A similar process is described in U.S. Pat. No. 4,364,743, which provides a list of vegetable oils that was made to react with various alcohols in the presence of the following catalysts: sodium alkoxide, sodium or potassium hydroxide and titanium tetrahydropropoxide (basic catalysts) or the sulfuric, alkyl sulfonic or aryl sulfonic acids.

Other documents forward similar processes with modifications in the production steps of other kinds of biodiesel, none of them mentioning however the straight use of the oleaginous seeds as raw material for the transesterification reaction. These documents are U.S. Pat. No. 5,525,126; U.S. Pat. No. 6,015,440; U.S. Pat. No. 6,174,501 and U.S. Pat. No. 6,211,390.

Other patents, such as for example U.S. Pat. No. 5,578,090; U.S. Pat. No. 6,017,369 and U.S. Pat. No. 6,129,773, teach and prove the technical viability of using several kinds of biodiesel, as such or in admixture with petroleum diesel as a fuel for vehicle or stationary engines.

In one way or another, and at different sophistication levels, the basic feature of these prior art processes is always a transesterification of vegetable oil or animal fat triglycerides, with lower primary alcohols, catalyzed by an acidic or basic, soluble or not, catalyst. Product and by-product (esters and glycerin) refining is performed at different quality and purity grades, after the physical separation of the two liquid phases formed in the reactor after distilling the remaining excess alcohol.

It should be pointed out that in all the cited patents either the process is to be carried out on a high cost, purified or semi-purified vegetable oil, or it is carried out on a sort of waste or by-product having low oil content. This means most of the time a high cost/benefit ratio, since the starting raw material—vegetable oil—has a higher price than the final biodiesel product. Further, according to the state-of-the-art technique, the alcohol, either methyl or ethyl alcohol, even if partly recycled or recovered, must be supplied from external sources. That is why, in spite of the huge government interest of several countries on the biodiesel technology and production, still heavy subsidies are required for supplying biodiesel in gas stations. On the contrary, the process of the present application, by carrying the transesterification reaction on seeds and generating all the required reaction ethyl alcohol, besides other valuable co-products such as pure glycerin, agricultural fertilizers and cattle feed, dispenses with subsidizing and may be produced industrially at a reasonable cost without any burden to the economy.

Brazilian patent PI BR 8003739 teaches a process for extracting vegetable oils from seeds for obtaining a fuel using methyl or ethyl alcohol with the concomitant partial modification of oil into methyl or ethyl esters that are soluble in the corresponding alcohols. The so-obtained fuel is useful for diesel or similar engines. In spite of the reported transesterification reaction and the resulting fuel, the technique of the said Brazilian patent does not lead to a biodiesel product as specified in the above cited ASTM PS 121-99 Method. To begin with, at the time of the research that led to said patent was carried out, the term biodiesel meant the vegetable oil itself, as used in diesel engines. Since petroleum diesel contains $C_8$–$C_{22}$ hydrocarbon molecules, and vegetable oil $C_{12}$–$C_{18}$ moieties linked to a glycerol residue, the similarity of the molecules led to experiments for replacing petroleum-derived molecules for vegetable oils. It should be noted that the heating until the ethyl alcohol boiling point used in the process of PI BR 8003739 entrains vegetable components present in the seeds that are harmful to the produced fuel, such as pigments, vitamins, gum-generating phospholipids and even essential oils. The catalyst used, NaOH, yields soaps that should be withdrawn from the final product. Also, free glycerol is left in the final product, which on burning in the engine yields acrolein, a potent carcinogen. The glycerol amount based on the reaction stoichiometry is nearly 10% by weight of the final product. This is exceedingly more than allowed by the present ASTM PS 121-99, limited to 0.02 wt %.

Therefore, in spite of the state-of-the-art developments, the technique still needs an economically viable process for preparing biodiesel where the transesterification of the triglycerides present in an oleaginous seed be effected directly and integrally on such seeds, dispensing with the step of oil extraction from such seeds and the need to supply ethyl alcohol from external sources while at the same time producing pure glycerin and valuable agricultural co-products, such a process being described and claimed in the present application.

SUMMARY OF THE INVENTION

The present invention relates to a process for producing biodiesel for fuel, the process using directly the castor bean seeds as raw material to promote the transesterification of vegetable oils contained in same seeds with anhydrous ethyl alcohol, the reaction being catalyzed by a basic catalyst. This makes possible extremely high conversions without soap generation, the produced biodiesel fuel having sufficiently polar features to allow it to work as a co-solvent in the stabilization of anhydrous or hydrated ethanol admixtures with petroleum related products such as diesel oil and gasoline presently in use in Brazil.

Still, the invention makes possible to produce all the ethyl alcohol required by the transesterification reaction through a process for conventional carbohydrate fermentation of a portion of the reaction residual filter cake.

Further, the present invention promotes the conversion of the hull and final residua into an agricultural fertilizer.

Still further, since the filter cake is ricin-free, the present invention makes possible to use the residual filter cake as a constituent of cattle food.

Still, the present invention provides, by decantation, the separation of the obtained glycerin, which may be used as a raw material for related industries.

The present invention further provides an economically viable process for producing biodiesel that dispenses with any government subsidies to its commercialization.

The present invention provides therefore a sustainable process for producing biodiesel.

DETAILED DESCRIPTION OF THE PREFERRED MODES

Figure 1:
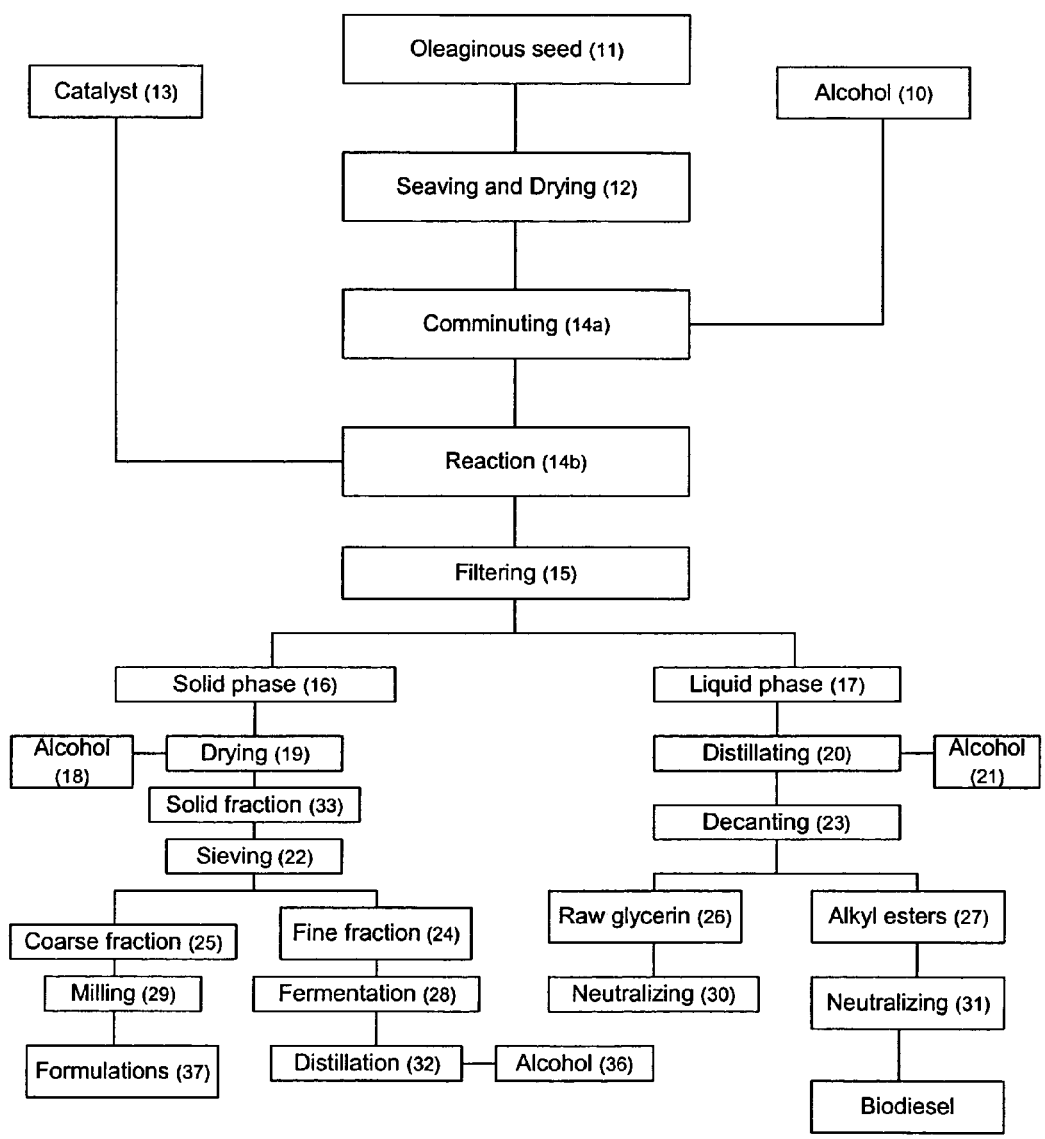
FIG. 1 attached is a flowsheet that illustrates the process of the invention.

The present process is directed to producing a biodiesel fuel straight from oleaginous seeds, by transesterifying the triglycerides present in oleaginous seeds, such as soybean, peanuts, sunflower, and colza, being specially adapted to castor bean seeds and anhydrous ethyl alcohol in the presence of an alkaline catalyst.

The process may be carried out in a continuous or batch mode, or by alternating continuos and batch modes.

The seed on which is to be applied the transesterification process of the invention for producing biodiesel may be any triglycerides-rich oleaginous seed, that is, a seed having between 15% and 70% by weight of esterifiable triglycerides based on the total seed weight.

Seeds useful for the purposes of the invention are, for example, those of sunflower, peanuts, colza or soybean. Particularly preferred is the castor bean seed, this being due to its easy production in lean soils, with the possibility of consortium cultures with sweet manioc or beans, and small scale, familiar cultures that dispense with agricultural intensive technology.

According to the present process, the seeds are made to contact an alcohol, preferably anhydrous alcohol, for example methyl alcohol or ethyl alcohol, in the amount of 4:1 to 0.5:1 parts, preferably of from 1.5:1 to 0.5:1 parts.

The optimum ratio of ethyl alcohol to seeds will be a function of the kind of seed, and the equipment used. Thus for an equipment that is not mechanically driven, it may be required to use more ethyl alcohol to render the mixture fluid and workable. In industrial facilities, less fluid mixtures may be used. In any case any excess alcohol is to be recycled.

It should be pointed out that according to the invention the alcohol employed is the esterifying agent, the reaction solvent as well as a vehicle for the solid phase. In terms of the transesterification reaction only, the amount of ethyl alcohol is ca. 15% based on the oil contained in the seed. Castor bean seeds contain 50 wt % oil.

In order to make the contact easier and hasten the reaction, the reactor is provided with a suitable propeller, which turns the reaction mass into a homogeneous suspension after a period of 15 to 30 minutes.

Once the suspension if formed, and in order to shift the triglycerides transesterification reaction towards the products, a catalyst is normally employed.

Catalysts useful for the practice of the invention are alkaline alkoxides or preferably an alcoholic solution of sodium or potassium ethanoate or titanium tetrahydropropoxide. The catalyst amount is of from 0.1 to 5.0%, preferably of from 0.3 to 1.5% by weight based on the weight of the seed feed.

The transesterification reaction occurs at a temperature between 30° C. and 78° C., preferably between 45° C. and 55° C., under reflux, for a period between 30 to 90 minutes, when a conversion between 98 to 100% of the triglycerides into fatty acid monoesters is attained.

After the end of the reaction, the hot products are separated by filtration of the reaction mass followed by atmospheric distillation of the ethyl alcohol remaining in the liquid phase leaving the filter. At the end of the condensed alcohol collection, the distiller liquid is transferred to a decanting tank, where it will stand for a period sufficient to separate the raw glycerin—lower phase—from the ethyl esters—upper phase. After being collected, the glycerin phase and the ester phase are directed to distinct neutralization columns, one for each product, the columns being filled with slightly acidic ion exchange resins.

The filter cake is employed as a source of alcohol production, and may afterwards be recycled to the process or used as cattle feed.

Seed hulls are also utilized as an agricultural product.

The invention will now be described based on the flowsheet of FIG. 1 attached to the present specification.

Prior to the process itself, the oleaginous seed feed (11) is processed (12) with the aid of vibrating sieves provided with a hot air vent in order to withdraw foreign vegetable elements, and dried until reaching a humidity content of less than 0.5% by weight.

Upon leaving the sieves, the seed feed is directly fed to a reactor. Then anhydrous alcohol (10) from a storage tank is poured on the seeds in the reactor. The heterogeneous feed in the reactor is then comminuted (14a) at ambient temperature. Catalyst (13) is then added to the reactor without any heating, and then heating of the reaction mass is started in order to promote the transesterification reaction (14b) until a 98 to 100% conversion of the triglycerides into fatty acid monoesters is attained.

Then the hot reaction mass is filtered (15) and the liquid phase (17) leaving the filter is pumped to a distilling for (20) where alcohol (21) remaining in the liquid phase is distilled under atmospheric pressure. After the end of the condensed alcohol collection, the distiller liquid is transferred to a decanting (23) tank where it will stay for the required period of time to separate raw glycerin—lower phase—from ethyl esters—upper phase. After being collected, the raw glycerin phase (26) and the alkyl ester phase (27) are directed to distinct neutralization columns (30) and (31), one for each product, columns (30) and (31) being filled with a slightly acidic ion exchange resin. The neutralized alkyl ester corresponds to biodiesel fuel. Typical analyses of the two kinds of biodiesel fuel products obtained in the experiments are listed in Table 2 below.

After being recovered from the filter press linings, the solid phase (16) is dried (19) in a vacuum oven at 45° C. during ca. 16 h to recover the remaining ethanol (18) still retained in the mass. Then the obtained solid fraction (33), a dried flour, may be sieved (22) in a set of vibrating sieves to separate the finest solids of granulometry of up to 20 mesh Tyler, that is the carbohydrate fraction. This fine fraction (24) will then be submitted to a hydrolysis and fermentation (28) process so as to render possible that after the atmospheric distillation (32) of the remaining residue in the fermenting tank, ethanol (36) may be produced to make up the alcohol (10) feed to the transesterification reaction (14b). This step is not required when the dried flour is directed to cattle feeding.

As for the coarser fraction (25) of the flour, chiefly made up of the seed hulls, such coarser fraction is milled (29) in a ball mill until it reaches the approximate granulometry of up to 20 mesh Tyler. Mineral supplements required for making up formulations (37) of fertilizers suitable to be used in the oleaginous bean culture itself may then be added.

The triglycerides transesterification reaction carried out on the very seeds that contain those triglycerides not only makes the process simpler, but also renders it more economically interesting since:

a) it lowers the raw material cost by dispensing with the use of vegetable oils that require a pre-processing to be extracted from the seeds and then refined;
b) a conventional fermentation process based on the carbohydrates present in the reaction residual seed cake separated from the alcohol phase that contained esters and glycerin, yields ethyl alcohol to be used in the reaction;
c) allows to re-utilize hulls, wastes and ashes produced during the seed cleaning, hulling and drying steps, yielding a fertilizer that may be used in the castor bean seed culture itself.

Besides, the present process is environmentally friendly since:

a) it does not yield residues that cannot be processed;
b) its main product, to be used as a substitute for diesel, is less pollutant and provides petroleum savings, this being potentially important for non-oil producing countries, or countries that do not produce it in sufficient amounts, being forced to import petroleum oil to obtain diesel oil.

The present invention will now be illustrated by the following example, which should not be construed as limiting same.

EXAMPLE 1000 g of raw castor bean seeds (*Ricinus Communis* L) of the Brazilian variety known as "Bull Heart", processed as described above were added to a reactor together with 800 g ethyl alcohol and comminuted under vigorous agitation, at ambient temperature, until the reaction mass was a fluid, homogeneous suspension.

Then 40 g of sodium alkoxide catalyst were incorporated to the mixture and for 1 hour under moderated agitation and reflux, under atmospheric pressure and constant temperature of 50° C., the transesterification reaction of said seeds was carried out.

Then, the reactor charge was cooled to 40° C. and filtered, yielding 600 g of solid phase and 1240 g of a filtrate that after being distilled at atmospheric pressure, provided the recovery of 680 g raw ethyl alcohol condensate and 560 g of a liquid residue, remaining in the distiller, made up of a mixture of esters, glycerin and other by-products.

Once transferred to a decanter where it was kept for two hours at ambient temperature of ca. 25° C., this residue indicated two distinct phases that, after separation, weighed 55 g of raw glycerin (lower phase) and 505 g of esters (upper phase) that after neutralization in a column provided with an ion exchange resin with acidic sites had the features shown in Table 1 below.

The solid phase was dried in a vacuum oven, provided with a condenser at 50° C. during 16 hours at a 600 mm Hg pressure, which made possible to recover an additional 80 g ethyl alcohol and 520 g of dry meal.

The dried meal was then sieved in a set of vibrating sieves that yielded two main fractions. The finer fraction having a granulometry lower than 20 mesh Tyler, weighed 300 g and could be directed to a specific fermentation process to yield ethyl alcohol, or else to be stored and used as cattle feed.

The coarser fraction, having granulometry higher than 40 mesh Tyler, weighed 100 g and after being milled in a ball mill until an average grain size of 20 mesh was directed to fertilizer formulation where it could be added of a few mineral supplements so as to turn it suitable for use in the castor bean seed culture itself. Intermediate fractions are continuously reprocessed.

Table 1 below lists the main features of the esters resulting from the Example.

TABLE 1

| Feature | Method | Result |
| --- | --- | --- |
| Monoester content, wt % | Infrared Spectrometry | 98.9 |
| Acid number, mg KOH/g | ASTM D 664 | 0.20 |
| Aspect | Visual | Clear and transparent |
| ASTM Color | ASTM D1500 | 1.5 |
| Free Glycerin, wt % | Infrared Spectrometry | 0.4 |
| Viscosity @ 40° C., cSt | ASTM D 445 | 4.6 |
| Density @ 20/4° C. | ASTM D 1298 | 0.912 |
| Contaminants, % vol. | ASTM D 1769 | 0.7 |

Table 2 below lists results obtained after mixtures of 5 wt % and 10 wt % of the obtained esters with Diesel D, the metropolitan diesel produced in the Refineries owned by the Applicant, the features of which are also indicated in Table 2. It can be seen that by analogy with typical data for Diesel D itself, the biodiesel product of the invention may be used in admixture with Diesel D as a fuel in urban vehicles.

The advantages for the improvement of the town air quality are evidenced by the rise in the resulting cetane number that makes possible the more complete fuel burning by buses and trucks engines, which ultimately lowers pollution.

There is further a corresponding reduction in sulfur content by dilution, with sulfur being also considered a serious pollutant resulting from the burning of conventional diesel oil.

It should also be emphasized that the presence in the molecule of the ethyl esters of castor bean oil (91% ethyl ricinoleate) of a hydroxyl group (14.7% oxygen) conveys to these products an extra polarity. This makes them able to work as co-solvents for stabilizing anhydrous or hydrated ethyl alcohol mixtures with diesel and gasoline at much higher levels than those obtained in present days.

A further advantage is obtained by considering that the presence of those esters in these ternary mixtures also increase the tolerance ability of same to water contamination, so that they resist for longer times to undesirable ethyl alcohol stratification generally occurring in biodiesel and gasoline storage tanks.

Data from Table 2 below lead to the conclusion that the features of both biodiesel compositions are similar to those of an ordinary metropolitan biodiesel, as diesel D.

TABLE 2

| Feature | Method | Typical diesel D (1) | Biodiesel A (2) | Biodiesel B (3) |
| --- | --- | --- | --- | --- |
| Aspect | Visual (4) | Pass | Pass | Pass |
| ASTM Color | ASTM D 1500 | L 1.0 | L 1.0 | L 1.0 |
| Sulfur, wt % | ASTM D 4294 | 0.184 | <10 ppm | <10 ppm |
| Distillation (50% recovered) ° C. | ASTM D 86 | 281.9 | 293 | 298 |
| Distillation (85% recovered), ° C. | ASTM D 86 | 345.8 | 341 | 328 |
| Density @ 20/4° C. | ASTM D 4052 | 0.8490 | 0.8525 | 0.8541 |
| Viscosity @ 40° C., cSt | ASTM D 445 | 3.383 | 3.664 | 3.944 |
| Cold filter plugging point ° C. | IP 309 | −5 | −6 | −8 |
| Copper corrosiveness | ASTM D 130 | 1 | 1 | 1 |
| Ashes, wt % | ASTM D 482 | <0.0010 | <0.0010 | <0.0010 |
| Ramsbottom Carbon Residue (10% final distillation), wt % | ASTM D 524 | 9 | 9 | 9 |
| Cetane Number | ASTM D 613 | 41 | 46 | 48 |
| Water and sediments, wt % | ASTM D 1769 | Zero | zero | Zero |

Notes:
(1) Technical Rules National Fuels Department - 02/97 - Regulation 32, of Aug. 04, 1997.
(2) 95% vol. diesel D and 5% vol. of the exemplary esters
(3) 90% vol. diesel D and 10% vol. of the exemplary esters
(4) Clear and free from impurities A study carried out by the Applicant on the economical feasibility of the present process indicated that by accounting the cost of the raw material, that is, seeds, ethyl alcohol (practically no-cost since it is a co-product), catalyst and process costs, and on the other hand, the profits from the main product biodiesel, as well as co-products technical grade glycerin, cattle feed and fertilizer leads to a final price of the biodiesel around US$ 0.30 per liter, which is highly competitive.

While the invention has been described based on preferred embodiments, the description above should not be construed as limiting the invention, the said limitation being restricted to the scope of the appended claims.

We claim:

1. A process for producing biodiesel fuel using triglyceride-rich oleaginous seed directly in a transesterification reaction in the presence of an alkaline alkoxide catalyst, wherein the process comprises the following steps:
    a) sieving and drying triglyceride-rich oleaginous seed;
    b) directly adding the oleaginous seed of step a) to a reactor;
    c) providing an anhydrous alkyl alcohol and adding the anhydrous alkyl alcohol to the oleaginous seed in the reactor of step b), wherein the amount of oleaginous seed to anhydrous alkyl alcohol is from 4:1 to 0.5:1, based on the amount of oil contained in the seed of step b);
    d) comminuting in the reactor the oleaginous seed and anhydrous alkyl alcohol of step c) at ambient temperature, so as to obtain a homogenous suspension;
    e) adding an alkaline alkoxide catalyst to the homogenous suspension obtained in step d), wherein the amount of catalyst added is from 0.1 to 5 wt % based on the weight of oleaginous seed, and allowing the transesterification reaction to occur for 30 to 90 minutes at temperatures between 30 and 78° C., so as to obtain a reaction mass comprising alkyl ester products at a 98–100% conversion rate;
    f) filtering the reaction mass obtained in step e), so as to obtain a liquid phase and a solid phase, wherein the liquid phase comprises the alkyl ester products obtained in step e);
    g) distilling the liquid phase obtained in step f), so as to recover an excess amount of alcohol to be recycled in step c) and a remaining phase;
    h) decanting the remaining phase obtained in step g), so as to obtain glycerin and an alkyl esters phase, wherein the alkyl esters phase comprises the alkyl ester products obtained in step e); and
    i) neutralizing the alkyl esters phase obtained in step h) so as to obtain neutralized alkyl esters recovered as biodiesel fuel;
    wherein the triglyceride-rich oleaginous seed is not subjected to an oil-extraction step prior to the transesterification reaction of step (e).

2. A process according to claim 1, wherein the triglyceride-rich oleaginous seed is sunflower, colza, soybean or peanut seed.

3. A process according to claim 1, wherein the triglyceride-rich oleaginous seed is castor bean seed.

4. A process according to claim 1, wherein the seed to alcohol ratio in step c) is 1.5:1 to 0.5:1.

5. A process according to claim 1 wherein the catalyst added in step e) is sodium or potassium ethanoate in an amount of 1.5 wt % based on the weight of seed.

6. A process according to claim 1, wherein the transesterification reaction of step e) is carried out at 45–55° C. for 40–60 minutes.

7. A process according to claim 1, further comprising the following steps j)–m);
    j) drying the solid phase obtained in step f) so as to recover the remaining alcohol for recycling to step c) and a dried solid phase;
    k) sieving the dried solid phase obtained in step j) so as to obtain a course fraction and a fine fraction, wherein the fine fraction is rich in carbohydrates and has a grain size of up to 20 mesh Tyler;
    l) subjecting the fine fraction obtained in step k) to a fermentation process, so as to obtain alcohol; and
    m) milling the coarse fraction obtained in step k) to a grain size of up to 20 mesh Tyler for use in fertilizers suitable for culturing the triglyceride-rich oleaginous seed used in step a).

8. A process according to claim 7, wherein the amount of alcohol obtained by the fermentation process of step l) is at least the amount required for performing the transesterification reaction of step e).

9. A process according to claim 1, wherein the neutralized alkyl esters obtained as biodiesel fuel in step i) are formulated into diesel and gasoline fuels.

10. A process according to claim 9, wherein the neutralized alkyl esters obtained as biodiesel fuel in step i) are formulated into diesel and gasoline fuels by admixture with anhydrous or hydrated ethyl alcohol.

11. A process according to claim 1, further comprising the following steps j) and k):

j) drying the solid phase obtained in step f) so as to recover the remaining alcohol and a solid fraction suitable for use as cattle feed; and k) recycling the alcohol obtained in step j) to step c).

12. A process according to claim 1, wherein the anhydrous alcohol added in step c) is ethyl alcohol.

* * * * *